United States Patent [19]

Lee

[11] Patent Number: 4,615,801

[45] Date of Patent: Oct. 7, 1986

[54] ROTARY FILTRATION MEANS IN THE FILTH CONDENSATION-DEHYDRATION APPARATUS

[76] Inventor: Chung Y. Lee, 375-21, Daebang-dong, Dongjaku-ku, Seoul, Rep. of Korea

[21] Appl. No.: 666,245

[22] Filed: Oct. 29, 1984

[51] Int. Cl.[4] .............................................. B01D 33/02
[52] U.S. Cl. ................................... 210/185; 210/391; 210/398; 100/935
[58] Field of Search ............... 210/770, 780, 398, 185, 210/241, 391, 394, 396, 402, 403, 409; 100/935

[56] References Cited

U.S. PATENT DOCUMENTS

| | | |
|---|---|---|
| 3,705,649 | 12/1972 | Arvanitakis ........................ 210/770 |
| 3,739,915 | 6/1973 | Kehoe et al. ..................... 210/399 X |
| 4,380,496 | 4/1983 | Maffet ................................ 210/780 |
| 4,406,795 | 9/1983 | Takacs et al. . |

*Primary Examiner*—Thomas Wyse
*Attorney, Agent, or Firm*—Birch, Stewart, Kolasch & Birch

[57] ABSTRACT

According to the present invention, it is possible to achieve filtration and dehydration of a large quantity of dregs. During the operation, since the rotary filtration cylinder 6a is washed, the holes in the rotary filtration cylinder 6a will not be choked with the dregs so that there is no need to interrupt the operation to clean the rotary filtration cylinder 6a during the operation and it is possible to continue the operation by treating a large amount of the dregs in a short period of time.

7 Claims, 3 Drawing Figures

ROTARY FILTRATION MEANS IN THE FILTH CONDENSATION-DEHYDRATION APPARATUS

DETAILED EXPLANATION OF INVENTION

The present invention relates to an improved filtration apparatus. According to the present invention, the waste product discharged from manufacturing factories and/or fish processing factories or food processing factories discharge the filth and the filth is dehydrated and filtrated by being conveyed through a screw conveyor and a filtration cylinder. The dregs formed around of the filtration cylinder are removed by pressurized water of high pressure air and/or vapor, etc. In order to attain the afore-mentioned process, the present invention is directed to obtaining the means for filtering the filth by rotating the low pressure portion of the entrance area of the filtration cylinder.

It is common practice in the prior art to use vacuum filter apparatus, centrifugal separators or roller presses, etc. However, since the dehydrated filth contains a high degree of hydratedness, there arises the problems of fuel expense for drying and burning up the filth as well as the transportation charges.

According to the Korean Utility Model Reg. No. 22021 entitled "HEATING-SYSTEM FILTH CONDENSATION-DEHYDRATION APPARATUS" owned by the inventor of the present invention, it is notable that, by supplying vapor at the inside of a screw cylinder in which the screw is rotating, since the filth is dehydrated and filtered by a fixed filtration cylinder which cannot be rotated by itself, dregs may be formed in small holes around the filtration cylinder and therefore, the dehydration effect is decreased during its operation, and the system must be periodically shut down to remove the dregs from the holes. Thus, the filtration and dehydration efficiency is considerably reduced.

In order to eliminate the disadvantages mentioned above, according to the present invention, a part of the discharging portion, that is the low pressure area of the filtration cylinder surrounding the outer circumference of the transfer screw is rotated slowly by the rotation of the roller attached to the bottom portion and, when the high pressure water or high pressure air and vapor is ingested through the ejecting pipe of the upper portion, the dregs formed in the small holes in and around the filtration cylinder are pushed to the inside of the filtration cylinder and the dregs disposed in the holes are washed away.

If a gap appears on the bottom portion due to the defacement of the filtration cylinder and the screw during the filtration operation, the filtration cylinder can be raised a little to approach to the bottom portion of the screw so that the distance between the rotating rollers supported by both sides of the filtration cylinder is narrowed a little and therefore it is possible to prevent the filth not treated by filtration from flowing into the inside. Thus, it is possible to obtain a high filtration and dehydration efficiency in the operation and also to treat a large amount of the filth at one time.

BRIEF EXPLANATION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
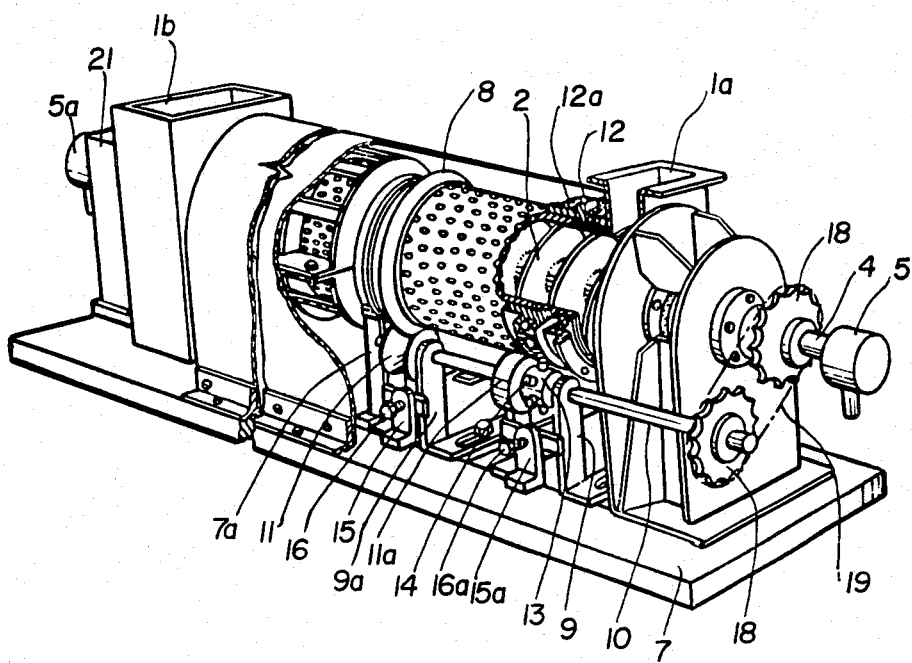
FIG. 1 is the perspective view of the present invention with cut-away portions in order to illustrate the construction of the apparatus of the present invention.
Figure 2:
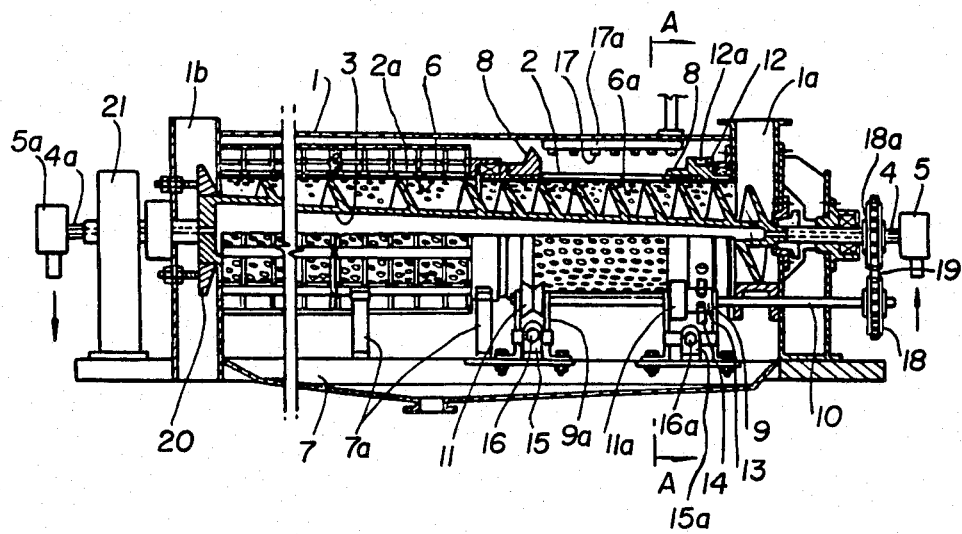
FIG. 2 is the cross-sectional view of the present invention taken along its length.
Figure 3:
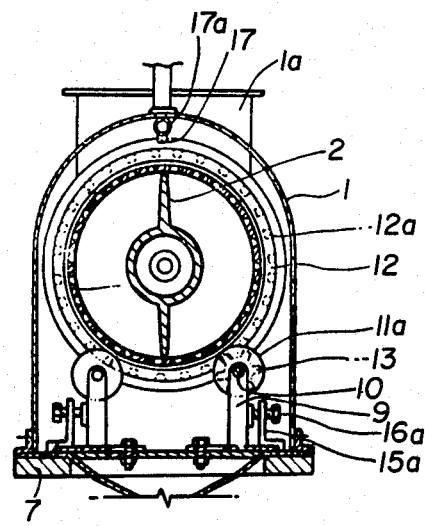
FIG. 3 is the cross-sectional view of the present invention taken along the line A—A of FIG. 2.

The present invention is explained in detail, in accordance with the accompanying drawings, as follows.

According to the present invention, the tapered heating cylinder 3 has an inlet 1a, double feed-screws 2 disposed in the narrow space, exhaust portion 1b and feed-screw 2a disposed in the wide space. The tapered heating cylinder 3 is attached to the body by a tubular, rotary shaft 4,4a so that the tapered heating cylinder 3 can be rotated. The vapor supply line 5 is attached to the tubular rotating shaft 4 and the vapor exhaust line 5a is attached to the tubular rotating shaft 4a.

The fixed filtration cylinder 6 is positioned in close proximity to the circumference of the feed-screw 2a having the wide space located on the exhaust portion 1b. One edge is fixed to the side of the body 1 and the central edge portion is supported by the supporting post 7a placed on the supporting plate 7. The independent rotary filtration cylinder 6a is positioned near to the circumference of the double feed-screws 2a having the narrow space located at the inlet 1a. The inner edge portion has the mountain-shaped guiding wheel 8 and the outer edge portion has the flat guiding wheel 8a and also connects to the driving roller 11a. The V-shape driving roller 11 is connected to the power transmission portion 10 attached to the moving support 9,9a located on the front of the bottom area thereof.

The supporting wheel 12 formed along the flat guiding wheel 8a has a plurality of holes 12a located therein. A rotating body 13 is connected to the driving roller 11a and is provided with projections 14 which engage with holes 12a causing the rotation. The fixing members 15,15a are connected to the outside of the moving support members 9,9a and are also screwed by the control bolts 16,16a, an injection pipe 17a having a nozzle 17 is installed on the upper part of the rotary filtration cylinder 16a. The chain gear 18 is connected to the edge of the power transmission shaft 10 and the chain 19 connects the chain gear 18 and the chain gear 18a placed on the tubular rotating shaft 4. The control valve 20 of the exhaust portion 1b and the speed reducing means 21 are connected to the tubular rotation shaft 4a.

Element 22 is a guiding roller, element 23 is a moving support of the guiding roller, element 24 is a fixed board and element 25 is a control bolt.

According to the present invention, the apparatus operates as follows.

When the speed reducing means 21 attached to the tubular rotating shaft 1a is rotated by the motor, the feed-screws 2,2a rotate at a low speed by the low speed rotation of the tapered heating cylinder 3. The filth or foul water mixed with the discharging and condensing agent is supplied through the inlet 1a formed on one side of the body 1 and is filtered and dehydrated during movement by the double feed-screws 2. Then, the vapor is supplied through the vapor supply line 5 attached to the tubular rotary shaft 4 and the tapered heating cylinder 3 is heated. In such a case, the protein in the filth or foul water is desolved and there thus arises the desirability of separating the solid materials and the water from the filth. The filtered water supplied through the holes in the filtration cylinder 6,6a may be drained off with the removal of almost all of the dregs. Since the mountain-shaped guiding wheel 8 and the flat guiding wheel 8a placed on both edge portions of the rotary filtration cylinder 6a engage the V-shaped driving roller 11 and the driving roller 11a and, on the other hand, the projections 14 on the rotary body 13 engage the holes 12 disposed on the supporting wheel 12a along the guiding wheel 8a, the rotary filtration cylinder 6a may rotate itself without causing any sliding and can cause good filtration as well as dehydration.

The guiding roller connected to the moving support is connected to the guiding wheel 8,8a together with the V-shape driving roller 11 or the driving roller 11a and also guides the rotary filtration cylinder 6a. By spraying the pressurized water or the compressed air and/or high pressure vapor through the injection pipe 17a having the nozzle 17 and located on the upper part of the rotary filtration cylinder 6a, the dregs filled in the holes of the rotary filtration cylinder can be cleaned away so that the holes are no longer choked with the dregs. Since the low pressure portion is formed with the double-feed screws 2, it is possible to pass the inner part of the rotary filtration cylinder 6a in a short time and provide a good and high filtration effect by preventing the dregs from filling up the holes of the rotary filtration cylinder 6a. The dregs of desolved materials are pressed by the feed-screw 2a having the wide space and also filtered at the fixed filtration cylinder 6, that is the high pressure portion and the dregs containing a reduced amount of the water is discharged out through the exhaust portion 1b by the pushing force from the control valve 20.

At this time, the feed-screw 2a pushed forward at the fixed filtration cylinder 6, the dregs containing a reduced amount of water and, when the dregs pass the inside of the fixed filtration cylinder 6, the dregs move forward due to thre pressure added to the inside of the fixed filtration cylinder 6 and the dregs do not fill the holes in the fixed filtration cylinder 6.

During the operation, if there occurs a gap between the bottom of the rotary filtration cylinder 6a and the double feed-screws 2 due to a defacement of the rotary filtration cylinder 6a and the double feed-screws 2, it is required to push the moving supporting members 9,9a by the control bolts 16,16a placed on the fixing members 15,15a attached to the outer side of the moving support members 9,9a connected to the power transmitting shaft 10. Then, the V-shaped driving roller 11 and the driving roller 11a may push the mountain-shaped guiding wheel 8 and the flat guiding wheel 8a connected to both sides of the rotary filtration cylinder 6a so that the double feed-screws 2 come into close contact with the bottom of the rotary filtration cylinder 6a and thus it is possible to increase the high filtration effect because the dregs are conveyed without filtration.

I claim:

1. A rotary filtration apparatus for the treatment of liquid-containing waste material which comprises
   a tapered heating cylinder,
   means for introducing a hot vapor into the tapered heating cylinder,
   a filtration cylinder rotatably and coaxially disposed around the inlet end portion of the tapered heating cylinder,
   a fixed filtration cylinder coaxially disposed around the outlet end portion of the tapered heating cylinder,
   screw conveying means rotatably and coaxially disposed within the rotatable and fixed filtration cylinders,
   means for spraying the surface of the rotatable filtration cylinder, and
   movable support members adapted to engage with and support the rotatable filtration cylinder, whereby the waste product can be easily filtrated and dehydrated through the coaction between the screw cylinder and the filtration cylinder, the said waste product formed around the filtration cylinder can be removed by the pressure of the spraying means, and the gap between the cylinder and screw due to operational defacement can be adjusted.

2. The rotary filtration apparatus of claim 1, wherein the filtration cylinder has a plurality of holes therein.

3. The rotary filtration apparatus of claim 1, wherein a portion of the conveying screw member has a narrow space between the adjacent screws thereof.

4. The rotary filtration apparatus of claim 1, wherein a portion of the conveying screw member has a wide space between the adjacent screws thereof.

5. The rotary filtration apparatus of claim 1, wherein the movable support members are movable toward each other.

6. The rotary filtration apparatus of claim 1, wherein the movable support member includes a driving roller having a "V" shaped configuration which supports a sleeve member disposed on the periphery of the filtration cylinder.

7. The rotary filtration apparatus of claim 6, wherein the movable support member further includes a plurality of projecting members adapted to engage with a plurality of slots disposed on the filtration cylinder.

* * * * *